Figure 1:
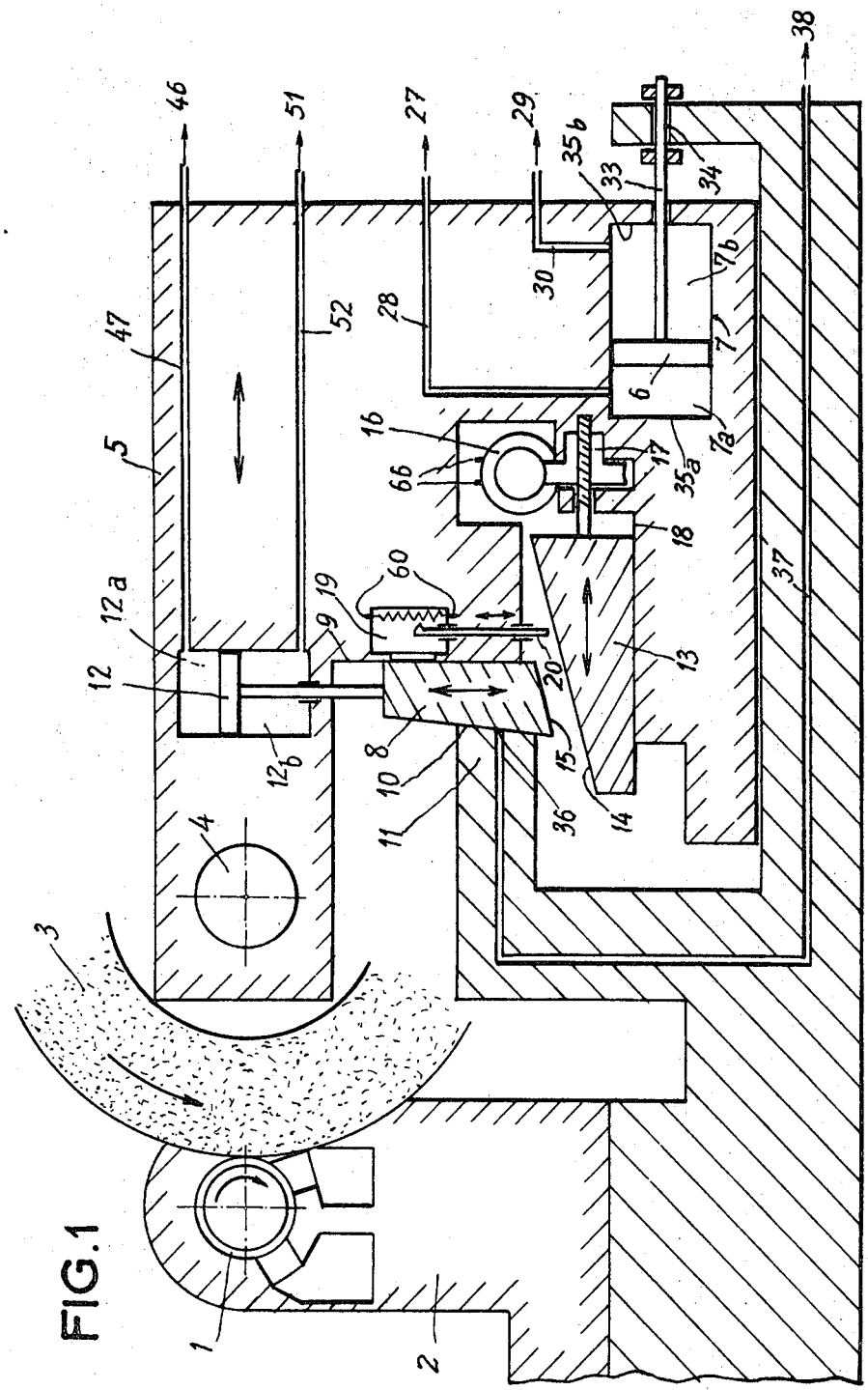

United States Patent

[11] 3,577,685

| [72] | Inventors | Louis Corbex;<br>Roger Burdet, Annecy, France |
|---|---|---|
| [21] | Appl. No. | 720,086 |
| [22] | Filed | Apr. 10, 1968 |
| [45] | Patented | May 4, 1971 |
| [73] | Assignee | Societe Nouvelle De Roulements<br>Annecy (Haute-Savoie), France |
| [32] | Priority | June 13, 1967 |
| [33] | | France |
| [31] | | 110151 |

[54] GRINDING MACHINE WITH A FEED CONTROL DEVICE
8 Claims, 2 Drawing Figs.

[52] U.S. Cl. .................................................. 51/165
[51] Int. Cl. .................................................. B24b 49/00
[50] Field of Search .................................. 51/165.01,
165.02, 165.03, 165.04, 165.05, 165.06

[56] References Cited
UNITED STATES PATENTS

| 2,028,642 | 1/1936 | Arter et al. | 51/50 |
| 2,924,915 | 2/1960 | Rudnicki | 51/165 |
| 2,984,952 | 5/1961 | Gebel | 51/165 |

Primary Examiner—Lester M. Swingle
Attorney—Stevens, Davis, Miller & Mosher

ABSTRACT: The device comprises the combination of two movable wedge members having each a moderately inclined plane, said wedge members being displaceable in two directions substantially at right angles to each other, the first wedge member abutting at the end of the approach stroke of the grinding wheel against a fixed stop of the frame structure of the machine, the second wedge member determining the end position of the first one, electric means for detecting the end position of the first wedge member in relation to the other one and controlling the finishing and planishing operations performed on the workpiece, by controlling the relative positions of the wedge members.

GRINDING MACHINE WITH A FEED CONTROL DEVICE

The present invention relates to a device for controlling the grinding-head feed in a butt-working grinding machine.

The function of a device for controlling the feed of the grinding head in a butt-working grinding machine is to regulate the rate of penetration or "plunging" of the grinding wheel into the workpiece, and as a rule this device is designed for producing three grinding phases consisting of the rough-grinding, the finishing and the planishing, i.e. a final grinding operation to achieve a polished surface, of the workpiece. Each phase is characterized by predetermined stroke and speed values.

The planishing operation is usually performed by stopping the grinding head against an abutment or stop while the wheel continues to operate during a certain time, notably under the influence of the spindle flexions. The resulting dimension is subordinate to the position of the feed abutment and of the planishing time.

In known grinding machines of this type the grinding head is usually fed by a hydraulic or mechanical feed device until it engages a fixed stop or abutment. In more elaborate mountings the grinding head is fed hydraulically against a movable stop controlling the feed rate and the stopping position at the end of the stroke.

The automatic regulation of the workpiece dimensions is obtained by checking the dimension on a previously finished workpiece and transmitting the correction information to the machine for grinding the next workpiece.

However, it is rather difficult to adapt this regulation system to known feed systems due to the extremely low value of the movements to be controlled and to the irregularities occurring in the feed rates.

Moreover, due to the flexions, expansions and premature wear of the grinding wheels, it is difficult to maintain constant finishing and planishing values.

It is therefore the object of the present invention to provide a simple device for controlling the feed of the grinding head, whereby the inconveniences described hereinabove are avoided by resorting to an automatic dimension regulation, this device being adapted to be easily incorporated in the grinding head.

This device is characterized in that it consists of the combination of two movable wedges of relatively moderate inclination or slope, which move with the grinding head and are adapted themselves to move in directions substantially at right angles to each other, the first wedge member abutting at the end of the approach stroke of the grinding wheel against a fixed stop carried by the frame structure of the machine, the other wedge fixing the end position of the first wedge, electrical means for detecting the position of the first wedge in relation to the other wedge and controlling the workpiece finishing and planishing operations by controlling the relative positions of said wedges.

With the device of this invention it is possible to impart the requisite regularity of the grinding head feed movements by using simple surfaces such as the inclined planes of wedge members.

The device of this invention further permits, by associating two wedges, amplifying the movements and providing an accurate location of the different grinding phases as well as of the end position of the first wedge.

The absence of play between the grinding head, the first wedge and the frame structure of the machine, on the one hand, and between the two wedges on the other hand, warrant a true dimensional correction. The absence of play between the various members is obtained by causing their surfaces to engage each other under the action of hydraulic cylinder-and-piston actuators.

Figure 2:
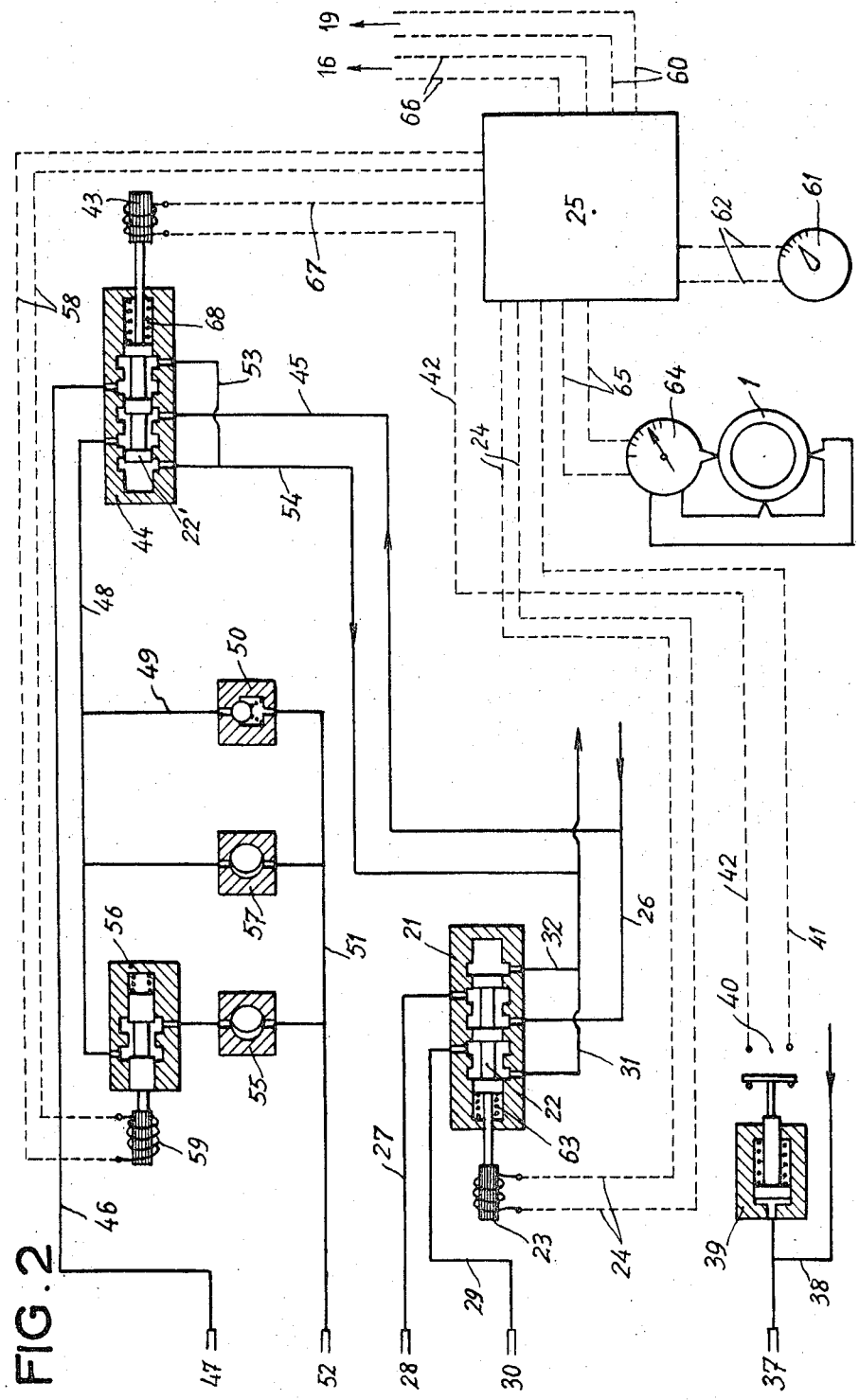

Other features of the invention will appear as the following description proceeds with reference to the accompanying drawing illustrating diagrammatically by way of example a typical and exemplary form of embodiment of the grinding-machine feed control device constituting the subject matter of this invention. In the drawing:

FIG. 1 is a diagrammatic part sectional, part elevational view of a grinder equipped with this device, and FIG. 2 is a diagram illustrating the various control members and the control fluid circuit means thereof.

Referring to the drawing, it will be seen that the workpiece 1 to be ground is positioned on the workpiece support 2, the grinding wheel 3 being mounted on the spindle 4 of the grinding head 5. A hydraulic cylinder-and-piston double-acting actuator 6 having its cylinder 7 rigid with the head 5 controls the horizontal feed thereof and the fast feed of the grinding wheel 3 until a first wedge 8 constituting the feed abutment member, connected to the head 5 and movable vertically along one face 9 thereof, engages with its inclined face 10 the registering inclined face provided on the frame structure 11 of the grinding machine.

The feed abutment member 8 is responsive to a hydraulic double-acting hydraulic cylinder-and-piston actuator 12 for adjusting the various feed movements of the grinding wheel. The final grinding dimension of workpiece 1 is obtained when the feed abutment wedge 8 engages the other wedge 13 referred to herein as the dimension abutment member, of which an inclined face 14 underlies a parallel inclined face 15 of the feed abutment member 8. A device comprising a step-by-step motor 16 and a screw-and-nut device 17 associated with the dimension abutment member 13 is provided for moving this last-named member 13 along a horizontal face 18 of the grinding head 5 and thus positioning same.

A linear potentiometer 19 or any other suitable voltage divider rigid and movable with the feed abutment member 8 displays through its slider 20 the position of this wedge in relation to the dimension abutment member 13 to permit the adjustment of the various machining phases, namely the rough-grinding, finishing and planishing, in relation to the end dimension of the workpiece to be ground.

An electromagnetic distributor valve 21 (FIG. 2) having a slide valve 22 formed with three enlarged guide portions controls the fast feed of the grinding head 5 supporting the two wedges 8 and 13. This valve, having its control coil 23 connected through wires 24 to a control board 25, is adapted to distribute hydraulic fluid under pressure fed thereto via a pipe 26 either to another pipe 27 leading to the duct 28 opening into the front portion 7a of cylinder 7, or to a pipe 29 leading to the duct 30 opening into the rear portion 7b of the same cylinder. Pipes 31 and 32 connect the valve 21 to the fluid reservoir (not shown). In the position of slide valve 22 which is shown in FIG. 2, the fluid under pressure is directed towards the portion 7a of this cylinder. As the rod 33 of actuator 6 is held against motion in its bearing 34, the fluid pressure is exerted against the base 35a of cylinder 7 and moves the grinding head 5 to the position illustrated in FIG. 1, in which the feed abutment member 8 engages the frame structure 11, the grinding wheel 3 having completed its approach stroke.

The wedge 8 will then close the exhaust port 36 of a duct 37 connected via a pipe line 38 to a source of compressed air. The fluid pressure increment resulting therefrom in duct 37 actuates a pressure-responsive switch 39 connected to the pipe 38, so as to close electric contacts 40 connected in turn through conductors 41 and 42 to the control board 25 and to the terminals of the solenoid coil 43 of an electromagnetic valve 44 similar to valve 21 described hereinabove; a wire 67 connects the other terminal of this coil 43 to the control board 25 for supplying energizing current thereto.

The function of valve 44 is to deliver fluid under pressure from pipe line 45 to chambers 12a and 12b of actuator cylinder 12 either via pipe 46 and duct 47 or via pipes 48 and 49, a nonreturn valve 50, pipe 51 and duct 52.

A pair of pipe lines 53 and 54 connect the valve 44 to the pipe line 31 returning the fluid to the reservoir.

When the electromagnet 43 of valve 44 is energized, its core attracts the rod attached to the slide member 22' of this valve; under these conditions fluid under pressure is fed to chamber 12a and the actuator 12 moves the feed abutment member 8 towards the dimension abutment member 13. The rate of this feed movement (which determines the rough-grinding rate) is adjusted by the flow of fluid from chamber 12b of actuator 12 to valve 44 via duct 52, line 51, a first throttling diaphragm 55 and a two-way electromagnet valve 56, and another throttling diaphragm 57 connected in parallel to diaphragm 55 and valve 56. A pair of electric conductors 58 connect the coil 59 of valve 56 to the electrical control board 25; thus, the valve is closed when the electromagnet is energized.

The position corresponding to the end of the rough grinding operation is obtained by means of the slider 20 of a linear potentiometer 19 which is solid with the feed abutment member 8 engaging the dimension abutment member 13 when the equilibrium is achieved between the resistance value displayed by the potentiometer of control board 25 and that measured by the potentiometer 19 connected by electric conductors 60 to this control board. Then an electric signal is transmitted for controlling the closing of valve 56.

Only then can the hydraulic fluid flow from chamber 12b of actuator 12 through diaphragm 57, thus producing a lower feed rate of feed abutment member 8 and therefore of grinding head 5 to provide the finishing grinding speed.

The finishing feed movement is completed when the feed abutment member 8 engages the dimension abutment member 13.

At exactly that time, the potentiometer 19 will control the operation of a time switch 61 connected via conductors 62 to the control board 25. During the time-switch operation all the members remain in their end position for performing the planishing operation.

At the end of the time-switch operation an electric contact of time-switch 61 opens the energizing circuit of electromagnet valve 21. The slide member 22 thereof is then returned by the force of its spring 63 to its initial position, whereby the fluid under pressure is forced into the chamber 7b of actuator 6, while the fluid contained in chamber 7a is exhausted to the reservoir.

The fluid pressure exerted against the end face 35b of cylinder 7 will cause a rapid backward movement of the grinding wheel head 5, thus ending the planishing operation carried out on workpiece 1. The feed abutment member 8 will then uncover the port 36 connected via duct 37 to the compressed-air supply line 38, thus causing a pressure drop in said duct 37 and opening the contacts 40 of the pressure-responsive switch 39; therefore, the supply of energizing current to electromagnetic valve 44 is discontinued. The return spring 68 restores the slide member 22' of this valve to its position shown in FIG. 2. The fluid under pressure is then fed through nonreturn valve 50 to chamber 12b of actuator 12, and released from chamber 12a to the exhaust line and then to the reservoir. The feed abutment member 8 will then rapidly resume its initial position.

A measuring instrument 64 disposed externally of the above-described assembly and connected by conductors 65 to the control board 25 measures the workpiece dimension and supplies control signals to the step-by-step motor 16 connected to the board 25 by means of other conductors 66 so as to move the dimension abutment member 13 and thus correct, if need be, the dimension of the next workpiece to be machined.

Although the above description and the attached drawing refer to a preferred form of embodiment of this invention, it will be readily understood by anybody conversant with the art that various modifications and variations may be brought thereto without departing from the spirit and scope of the invention as set forth in the appended claims.

We claim:

1. A device for controlling a grinding head feed in a grinding machine, with automatic dimensional correction, said grinding machine comprising a frame structure, a grinding wheel mounted on a spindle of a movable head and a hydraulic actuator of the cylinder-and-piston type for controlling head movements, said device being characterized in that it comprises first and second movable wedge members having each an inclined plane of relatively moderate inclination, movable with said movable head and adapted themselves to move in directions substantially at right angles to each other, the first wedge member abutting at the end of the approach stroke of the grinding wheel against a fixed abutment of the frame structure of the machine, the second wedge member determining the end position of the first member, an electric device for detecting the end position of said first wedge member in relation to said second wedge member and controlling the finishing and planishing operations to be carried out on a workpiece by controlling the relative position of said wedge members.

2. A feed control device according to claim 1, further comprising a double-acting hydraulic actuator adapted to cause said first wedge member to move along a vertical face of the grinding head and voltage divider means having a slider adapted to follow the inclined face of the second wedge member which is movable along a horizontal face of said grinding head.

3. A feed control device according to claim 2, further comprising a compressed-air duct in said frame, the action effected by the actuator on said first wedge member beginning when said first wedge member closes said compressed air duct at the end of the approach stroke of said grinding head, a pressure-responsive switch causing the operation of a distributor valve of said actuator.

4. A feed control device according to claim 2, further comprising means to control the feed rate of said first wedge member by adjusting the rate of flow of the hydraulic fluid from said actuator through parallel arranged diaphragms.

5. A feed control device according to claim 2, wherein equilibrium between the value of the resistance of said voltage divider means and a preset resistance value releases an electric signal controlling the closing of a valve obturating one of said parallel diaphragms, thus determining the feed rate of the finishing phase.

6. A feed control device according to claim 5, wherein said voltage divider means is adapted, at the end of the finishing feed stroke corresponding to the abutment of the first wedge member against the second wedge member, to stop any further movements of the members concerned during the planishing phase.

7. A feed control device according to claim 2, further comprising time-switch means which at the end of its operating time controls the reversal of supply of hydraulic fluid under pressure to the actuator controlling the grinding head to stop the planishing operation and reverse the supply of fluid to the actuator of said first wedge member.

8. A feed control device according to claim 1, further comprising a step-by-step system responsive to a device for measuring the dimension of the workpiece after machining and which permits controlling the abutment position of said wedge members by displacing said second wedge member in order to correct for the dimensions of the next workpiece to be machined.